(12) United States Patent
Wu et al.

(10) Patent No.: US 12,082,268 B2
(45) Date of Patent: Sep. 3, 2024

(54) RESOURCE PROCESSING METHOD AND DEVICE

(71) Applicants: China Mobile Communication Co., Ltd Research Institute, Beijing (CN); China Mobile Communications Group Co., Ltd., Beijing (CN)

(72) Inventors: Dan Wu, Beijing (CN); Xueying Hou, Beijing (CN); Xiaodong Xu, Beijing (CN); Qixing Wang, Beijing (CN); Yi Zheng, Beijing (CN); Jing Dong, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 0 days.

(21) Appl. No.: 17/267,306

(22) PCT Filed: Aug. 7, 2019

(86) PCT No.: PCT/CN2019/099569
§ 371 (c)(1),
(2) Date: Feb. 9, 2021

(87) PCT Pub. No.: WO2020/029992
PCT Pub. Date: Feb. 13, 2020

(65) Prior Publication Data
US 2021/0321463 A1    Oct. 14, 2021

(30) Foreign Application Priority Data
Aug. 10, 2018    (CN) .......................... 201810907996.2

(51) Int. Cl.
*H04W 74/0833*    (2024.01)
*H04W 74/00*    (2009.01)
(Continued)

(52) U.S. Cl.
CPC ..... *H04W 74/0841* (2013.01); *H04W 74/008* (2013.01); *H04W 74/0891* (2013.01); *H04W 88/14* (2013.01)

(58) Field of Classification Search
CPC ........... H04W 74/0841; H04W 74/008; H04W 74/0891; H04W 88/14; H04W 74/0833;
(Continued)

(56) References Cited

U.S. PATENT DOCUMENTS

2012/0099515 A1*  4/2012  Chen ................... H04W 74/006
                                                  370/315
2013/0142107 A1   6/2013  Ohta et al.
(Continued)

FOREIGN PATENT DOCUMENTS

CN    101932117 A    12/2010
CN    102158980 A    8/2011
(Continued)

OTHER PUBLICATIONS

On Self-Optimization of the Random Access Procedure in 3G Long Term Evolution, All content following this page was uploaded by Fredrik Gunnarsson on May 21, 2014. Wireless Access Networks, Ericsson Research, Ericsson AB, Sweden (Year: 2009).*
(Continued)

*Primary Examiner* — Nizam U Ahmed
(74) *Attorney, Agent, or Firm* — Price Heneveld LLP

(57) ABSTRACT

A resource processing method and a resource processing device are provided. The method includes: configuring at least one downlink resource in addition to a cell-specific resource configuration; and/or configuring at least one uplink resource.

7 Claims, 4 Drawing Sheets

(51) Int. Cl.
*H04W 74/08* (2024.01)
*H04W 88/14* (2009.01)

(58) Field of Classification Search
CPC ............. H04W 56/0015; H04W 28/04; H04W 56/001; H04W 72/0406; H04W 48/12; H04W 84/042; H04W 72/20
See application file for complete search history.

(56) References Cited

U.S. PATENT DOCUMENTS

| | | | | |
|---|---|---|---|---|
| 2018/0092139 | A1* | 3/2018 | Novlan | H04W 76/12 |
| 2018/0220466 | A1* | 8/2018 | Park | H04W 74/0833 |
| 2019/0289621 | A1* | 9/2019 | Li | H04W 72/12 |
| 2019/0349180 | A1* | 11/2019 | Lu | H04L 27/2607 |
| 2021/0298088 | A1* | 9/2021 | Qi | H04W 74/0833 |

FOREIGN PATENT DOCUMENTS

| | | |
|---|---|---|
| CN | 102984772 A | 3/2013 |
| CN | 108289329 A | 7/2018 |
| EP | 2445297 A1 | 4/2012 |
| JP | 2019534625 A | 11/2019 |
| WO | 2011098362 A1 | 8/2011 |
| WO | 2012020503 A1 | 2/2012 |
| WO | 2018063892 A1 | 4/2018 |

OTHER PUBLICATIONS

ETSI TS 138 331 V15.2.1 (Jun. 2018), Technical Specification: 5G; NR; Radio Resource Control (RRC); Protocol specification (3GPP TS 38.331 version 15.2.1 Release 15 (Year: 2018).*
3GPP TSG RAN WG1 Meeting #93, Busan, Korea, May 21-25, 2018 (Year: 2018).*
NTT DOCOMO, Inc. "Remaining Issues on PRACH Formats", 3GPP TSG RAN WG1, Meeting #93, R1-1807053, Busan, Korea, May 21-25, 2018.
CMCC "Discussion on Remaining Issues for PRACH Formats", 3GPP TSG RAN WG1, Meeting #93, R1-1806357, Busan, Korea, May 21-25, 2018.
Sony, "Resource allocation in IAB", 3GPP TSG RAN WG2 Meeting #103, R2-1811417, Gothenburg, Sweden, Aug. 20-24, 2018.
RAN2, "LS on ssb-PositionsInBurst mismatch in SIB1 and ServingcellConfigCommon", 3GPP TSG RAN WG2 NR ad hoc #1807, R2-1810974, Montreal, Canada, Jul. 2-6, 2018.
Qualcomm Inc., "Enhancements to support NR backhaul links", 3GPP TSG RAN WG1 Meetin #93, R1-1807393, Busan, Korea, May 21-May 25, 2018.
LG Electronics Inc., "WF on timing of backhaul and access link in uplink", TSG-RAN WG1 Meeting #59b, R1-100807, Valencia, Spain, Jan. 18-22, 2010.
OPPO, "Discussion of backhaul link enhancement for IAB", 3GPP TSG RAN WG1 Meeting #93, R1-1806859, Busan, Korea, May 21-25, 2018.

* cited by examiner

RESOURCE PROCESSING METHOD AND DEVICE

CROSS-REFERENCE TO RELATED APPLICATION

The present application is the U.S. national phase of PCT Application PCT/CN2019/099569 filed on Aug. 7, 2019, which claims a priority to the Chinese patent application No. 201810907996.2 filed in China on Aug. 10, 2018, a disclosure of which is incorporated herein by reference in its entirety.

TECHNICAL FIELD

The present disclosure relates to the field of wireless communication, in particular to a resource processing method and device.

BACKGROUND

In order to satisfy application requirements of a high-capacity fifth-generation (5G) hotspot scenario, a dense deployment of high frequency bands needs to be adopted in future 5G deployments. To reduce the demand for optic fibers so as to reduce costs, an integrated access and backhaul (IAB) technique is required. The IAB adds a backhaul function on top of the access function of a high frequency base station, such that the base station is connected to the core network through a wireless link instead of an optic fiber in high-frequency deployments to achieve the backhaul function.

In new radio (NR) systems, a problem that an IAB node may not find an available physical random access channel (PRACH) resource for backhaul may arise because of the association mapping between valid random access opportunities (valid RO) and synchronous signal/physical broadcast channel blocks (SS/PBCH block).

SUMMARY

Embodiments of the present disclosure provide a resource processing method and device, to solve the problem that a node cannot find an available PRACH resource for backhaul.

In a first aspect, the present disclosure provides a resource processing method, applied to a first node, including:
configuring at least one downlink resource in addition to a cell-specific resource configuration; and/or configuring at least one uplink resource.

Optionally, the uplink resource at least includes a random access channel transmission opportunity corresponding to the downlink resource; or the uplink resource is orthogonal in time to a cell-specific random access opportunity or valid random access opportunity configured by the first node.

Optionally, the at least one configured downlink resource and/or the at least one configured uplink resource is cell-specific or dedicated.

Optionally, the downlink resource includes: a synchronous signal/physical broadcast channel block, and/or a channel state information reference signal.

Optionally, the downlink resource is a downlink resource configured for a backhaul link of a second node.

Optionally, the synchronous signal/physical broadcast channel block
includes at least one of:
a synchronous signal/physical broadcast channel block configured in an ssb-PositionsInBurst of a system information block 1 of the first node;
a synchronous signal/physical broadcast channel block configured in an ssb-PositionsInBurst of a ServingCell-ConfigCommon of the first node;
a synchronous signal/physical broadcast channel block configured by the first node through higher layer signaling.

Optionally, the uplink resource includes a physical random access channel transmission opportunity.

Optionally, the uplink resource is an uplink resource configured for a backhaul link of a second node.

Optionally, the uplink resource is offset in time by a fixed offset value from a cell-specific random access opportunity or valid random access opportunity configured by the first node.

Optionally, the offset value is configured explicitly by the first node.

Optionally, the uplink resource is determined based on a cell-specific resource configured by the first node.

Optionally, the uplink resource is configured independently of a cell-specific resource configured by the first node.

In a second aspect, an embodiment of the present disclosure further provides a resource processing method, applied to a second node, including:
acquiring at least one downlink resource configured by a first node, in addition to a cell-specific resource configuration; and/or acquiring at least one uplink resource configured by the first node.

Optionally, the uplink resource at least includes a random access channel transmission opportunity corresponding to the downlink resource; or the uplink resource is orthogonal in time to a cell-specific random access opportunity or valid random access opportunity configured by the first node.

Optionally, the at least one configured downlink resource and/or the at least one configured uplink resource is cell-specific or dedicated.

Optionally, the downlink resource includes: a synchronous signal/physical broadcast channel block, and/or a channel state information reference signal.

Optionally, the downlink resource is a downlink resource configured for a backhaul link of the second node.

Optionally, the synchronous signal/physical broadcast channel block includes at least one of:
a synchronous signal/physical broadcast channel block configured in an ssb-PositionsInBurst of a system information block 1 of the first node;
a synchronous signal/physical broadcast channel block configured in an ssb-PositionsInBurst of a ServingCell-ConfigCommon of the first node;
a synchronous signal/physical broadcast channel block configured by the first node through higher layer signaling.

Optionally, the uplink resource includes a physical random access channel transmission opportunity.

Optionally, the uplink resource is an uplink resource configured for a backhaul link of the second node.

Optionally, the uplink resource is offset in time by a fixed offset value from a cell-specific random access opportunity or valid random access opportunity configured by the first node.

Optionally, the offset value is configured explicitly by the first node.

Optionally, the uplink resource is determined based on a cell-specific resource configured by the first node.

Optionally, the uplink resource is configured independently of a cell-specific resource configured by the first node.

In a third aspect, an embodiment of the present disclosure further provides a resource processing method, applied to a third node, including:

determining a valid random access opportunity according to backhaul-related downlink resource relevant information and uplink resource relevant information.

Optionally, the backhaul-related downlink resource relevant information includes at least one of:

a backhaul downlink resource configured through higher layer signaling;

a synchronous signal/physical broadcast channel block.

Optionally, the backhaul-related uplink resource relevant information includes at least one of:

a backhaul uplink resource configured through higher layer signaling;

a random access resource.

Optionally, the valid random access opportunity includes:

a random access opportunity that is in the backhaul uplink resource and does not overlap with a first valid random access opportunity; and/or a random access opportunity that is in a resource at least N gap symbols after a last symbol of the backhaul downlink resource or at least N gap symbols after a last symbol of the synchronous signal/physical broadcast channel block, and does not overlap with the first valid random access opportunity; and/or a random access opportunity that does not precede a synchronous signal/physical broadcast channel block in a slot of the random access resource, is in a resource at least N gap symbols after a last symbol of the backhaul downlink resource or at least N gap symbols after a last symbol of the synchronous signal/physical broadcast channel block, and does not overlap with the first valid random access opportunity; wherein N is greater than or equal to 0.

Optionally, the synchronous signal/physical broadcast channel block is the same as a synchronous signal/physical broadcast channel block configured in an ssb-PositionsInBurst; or the synchronous signal/physical broadcast channel block is of a first SSB format reconfigured through higher layer signaling, wherein the first SSB format is a subset of SSB formats configured in the ssb-PositionsInBurst.

Optionally, the first valid random access opportunity is a valid random access opportunity determined according to downlink resource information and uplink resource relevant information configured through higher layer signaling.

Optionally, an association mapping is performed based on the valid random access opportunity and a synchronous signal/physical broadcast channel block.

In a fourth aspect, an embodiment of the present disclosure further provides a first node, including a first transceiver and a first processor; wherein the first transceiver is configured to configure at least one downlink resource in addition to a cell-specific resource configuration; and/or configure at least one uplink resource.

Optionally, the uplink resource at least includes a random access channel transmission opportunity corresponding to the downlink resource; or the uplink resource is orthogonal in time to a cell-specific random access opportunity or valid random access opportunity configured by the first node.

Optionally, the at least one configured downlink resource and/or the at least one configured uplink resource is cell-specific or dedicated.

Optionally, the downlink resource includes: a synchronous signal/physical broadcast channel block, and/or a channel state information reference signal.

Optionally, the downlink resource is a downlink resource configured for a backhaul link of a second node.

Optionally, the synchronous signal/physical broadcast channel block includes at least one of:

a synchronous signal/physical broadcast channel block configured in an ssb-PositionsInBurst of a system information block 1 of the first node;

a synchronous signal/physical broadcast channel block configured in an ssb-PositionsInBurst of a ServingCellConfigCommon of the first node;

a synchronous signal/physical broadcast channel block configured by the first node through higher layer signaling.

Optionally, the uplink resource includes a physical random access channel transmission opportunity.

Optionally, the uplink resource is an uplink resource configured for a backhaul link of a second node.

Optionally, the uplink resource is offset in time by a fixed offset value from a cell-specific random access opportunity or valid random access opportunity configured by the first node.

Optionally, the offset value is configured explicitly by the first node.

Optionally, the uplink resource is determined based on a cell-specific resource configured by the first node.

Optionally, the uplink resource is configured independently of a cell-specific resource configured by the first node.

In a fifth aspect, an embodiment of the present disclosure further provides a second node, including a second transceiver and a second processor; wherein the second transceiver is configured to acquire at least one downlink resource configured by a first node, in addition to a cell-specific resource configuration; and/or acquire at least one uplink resource configured by the first node.

Optionally, the uplink resource at least includes a random access channel transmission opportunity corresponding to the downlink resource; or the uplink resource is orthogonal in time to a cell-specific random access opportunity or valid random access opportunity configured by the first node.

Optionally, the at least one configured downlink resource and/or the at least one configured uplink resource is cell-specific or dedicated.

Optionally, the downlink resource includes: a synchronous signal/physical broadcast channel block, and/or a channel state information reference signal.

Optionally, the downlink resource is a downlink resource configured for a backhaul link of the second node.

Optionally, the synchronous signal/physical broadcast channel block includes at least one of:

a synchronous signal/physical broadcast channel block configured in an ssb-PositionsInBurst of a system information block 1 of the first node;

a synchronous signal/physical broadcast channel block configured in an ssb-PositionsInBurst of a ServingCellConfigCommon of the first node;

a synchronous signal/physical broadcast channel block configured by the first node through higher layer signaling.

Optionally, the uplink resource includes a physical random access channel transmission opportunity.

Optionally, the uplink resource is an uplink resource configured for a backhaul link of the second node.

Optionally, the uplink resource is offset in time by a fixed offset value from a cell-specific random access opportunity or valid random access opportunity configured by the first node.

Optionally, the offset value is configured explicitly by the first node.

Optionally, the uplink resource is determined based on a cell-specific resource configured by the first node.

Optionally, the uplink resource is configured independently of a cell-specific resource configured by the first node.

In a sixth aspect, an embodiment of the present disclosure further provides a third node, including a third transceiver and a third processor; wherein the third processor is configured to determine a valid random access opportunity according to backhaul-related downlink resource relevant information and uplink resource relevant information.

Optionally, the backhaul-related downlink resource relevant information includes at least one of:

a backhaul downlink resource configured through higher layer signaling;

a synchronous signal/physical broadcast channel block.

Optionally, the backhaul-related uplink resource relevant information includes at least one of:

a backhaul uplink resource configured through higher layer signaling;

a random access resource.

Optionally, the valid random access opportunity includes:

a random access opportunity that is in the backhaul uplink resource and does not overlap with a first valid random access opportunity; and/or a random access opportunity that is in a resource at least N gap symbols after a last symbol of the backhaul downlink resource or at least N gap symbols after a last symbol of the synchronous signal/physical broadcast channel block, and does not overlap with the first valid random access opportunity; and/or a random access opportunity that does not precede a synchronous signal/physical broadcast channel block in a slot of the random access resource, is in a resource at least N gap symbols after a last symbol of the backhaul downlink resource or at least N gap symbols after a last symbol of the synchronous signal/physical broadcast channel block, and does not overlap with the first valid random access opportunity; wherein N is greater than or equal to 0.

Optionally, the synchronous signal/physical broadcast channel block is the same as a synchronous signal/physical broadcast channel block configured in an ssb-PositionsInBurst; or the synchronous signal/physical broadcast channel block is of a first SSB format reconfigured through higher layer signaling, wherein the first SSB format is a subset of SSB formats configured in the ssb-PositionsInBurst.

Optionally, the first valid random access opportunity is a valid random access opportunity determined according to downlink resource information and uplink resource relevant information configured through higher layer signaling.

Optionally, an association mapping is performed based on the valid random access opportunity and a synchronous signal/physical broadcast channel block.

In a seventh aspect, an embodiment of the present disclosure further provides a first node, including a processor, a storage and a computer program stored in the storage and configured to be executed by the processor, wherein the processor is configured to execute the computer program to implement steps of the foregoing resource processing method.

In an eighth aspect, an embodiment of the present disclosure further provides a second node, including a processor, a storage and a computer program stored in the storage and configured to be executed by the processor, wherein the processor is configured to execute the computer program to implement steps of the foregoing resource processing method.

In a ninth aspect, an embodiment of the present disclosure further provides a third node, including a processor, a storage and a computer program stored in the storage and configured to be executed by the processor, wherein the processor is configured to execute the computer program to implement steps of the foregoing resource processing method.

In a tenth aspect, an embodiment of the present disclosure further provides a computer readable storage medium storing therein a computer program, wherein the computer program is configured to be executed by a processor to implement steps of the foregoing resource processing methods.

In embodiments of the present disclosure, the first node configures at least one downlink resources for one or more second nodes and/or configures at least one uplink resources, such that the configuration condition for uplink resources of a backhaul link may be restricted, to ensure that the uplink resource for the backhaul link configured by the first node includes a complete RO-SSB mapping period required by the second node.

Moreover, in the embodiments of the present disclosure, there is no need for the second node to perform an additional operation, and the configuration carried out by the first node ensures the mapping completeness and avoids conflict, that is, the configuration carried out by the first node ensures that the uplink resources of the second node can be mapped completely to downlink resources, and meanwhile avoids the conflicts resulting from the inconsistency with a mapping of accessing UE, thereby improving the effectiveness and reliability of communication.

DETAILED DESCRIPTION

To describe the technical problem to be solved, the technical solutions and the advantages of the present disclosure more clearly, embodiments are described in detail hereinafter with reference to the accompanying drawings.

Terms "first", "second" and the like in the specification and claims of this disclosure are adopted not to describe a specific sequence or order but to distinguish similar objects. It should be understood that data used like this may be interchanged under a proper condition for implementation of the embodiments of the disclosure described here in a sequence apart from those shown or described here.

Explanation of terminologies:

Donor gNB (also referred to as donor node): an anchor node connected to the core network via an optic fiber.

IAB node: a node not connected to the core network via an optic fiber, and capable of performing backhaul through a wireless link and providing an access function.

Figure 1:
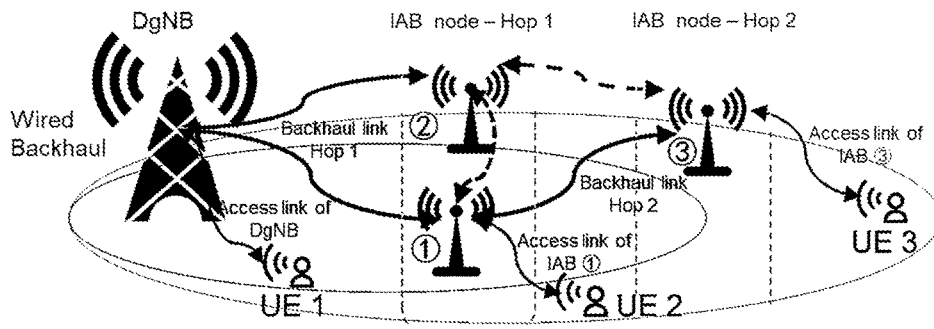
FIG. 1 is a schematic diagram of an IAB network in the related art.

Mother node: a node providing wireless backhaul for another node; as shown in FIG. 1, the mother node of the node ① is a DgNB, or may be the node ② as well; the mother node of the node ③ is the node ① and/or the node ②.

Child node: a node receiving a backhaul or access service; as shown in FIG. 1, the node ③ is the child node of the node ① and/or the node ②.

Access link: a link providing an access function, e.g., the link between the DgNB and the UE 1, the link between the IAB node ① and the UE 2, and the link between the IAB node ③ and the UE 3 in FIG. 1 are all access links.

Backhaul link: a link providing a backhaul function, e.g., the links between the DgNB and the IAB nodes ① and ②, the link between the IAB node ① and the IAB node ②, and the links between the IAB nodes ① and ② and the node ③ in FIG. 1 are all backhaul links.

Access UE: UE accessing the network to get service, e.g., UE 1, UE 2 and UE 3 as shown in FIG. 1; the UE may access the DgNB as well as the IAB node.

Before accessing the network, the IAB node searches cells according to the behavior of the terminal device (e.g., user equipment (UE)), reads system information to obtain a physical random access channel (PRACH) configuration, determines a valid random access opportunity (valid RO), and finds an appropriate RO position according to a mapping rule between synchronous signal/physical broadcast channel blocks (SS/PBCH block) and ROs to initiate a random access procedure to the network.

After the IAB node accesses the network, the network needs to identify some resources for the IAB node to perform backhaul, and also needs to configure a PRACH resource for the backhaul link of the IAB node, whereby uplink synchronization may be restored in case that the backhaul link is out-of-sync, or beam recovery may be performed for the backhaul link.

Figure 2:
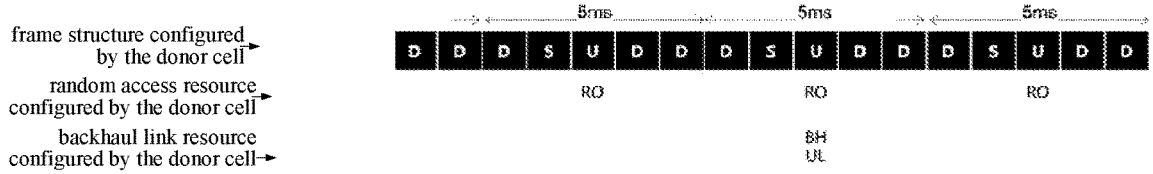
FIG. 2 is a schematic diagram of a resource configuration for a long term evolution (LTE) relay in the related art.

In the design of long term evolution (LTE) relay (which may be deemed as an IAB node), the backhaul link resource is configured semi-statically, wherein one uplink subframe is assigned every ten milliseconds (ms) in a fixed manner as uplink resource. As long as an uplink PRACH is configured within the subframe, the relay can initiate a random access over the backhaul link. As shown in FIG. 2, a backhaul link uplink resource (the backhaul UL (BH UL) portion shown in FIG. 2) configured by the donor cell is located in the first 5 ms of every 10 ms; as long as a PRACH resource is configured by the donor cell within the resource, the relay node may initiate a random access.

A PRACH resource configuration method and a method for the terminal device to determine a valid PRACH transmission occasion (PRACH occasion, or RO) and associate the RO with SSB in NR are described below.

1. PRACH resource configuration:

a) a base station configures, via a rach-ConfigCommon field in the system information block 1 (SIB1), cell-specific contention based random access (CBRA) and contention-free random access (CFRA) resources; except for beam failure recovery (BFR), all random access resources are indicated by the RO configured in the rach-ConfigCommon; the terminal device determines the valid RO (e.g., CBRA or CFRA) and an SSB-RO association mapping according to the actual SSB transmission format indicated in the SIB1 and the uplink-downlink resource configured in the SIB1.

b) the base station also configures, via a rach-ConfigBFR field in the UE-specific/dedicated uplink (UL) bandwidth part (BWP) configuration, a CFRA resource for BFR; the terminal device determines the valid RO (e.g., BFR) and an SSB-RO association mapping according to the actual SSB transmission format indicated in the SIB1 and the uplink-downlink resource configured in the SIB1.

2. Method for the terminal device to determine a valid RO:

if an RO is within the semi-statically configured uplink resources, or if the RO does not precede an SSB in a PRACH slot, and starts Ngap symbols after the SSB or a downlink symbol, the RO is valid.

3. Valid RO-SSB association mapping determination:

having determined the valid RO, the terminal device performs an association mapping between the valid RO and the SSB configured in the ssb-PositionsInBurst in SIB1 and/or SSB configured in the ssb-PositionsInBurst in the ServingCellConfigCommon, to determine the SSB corresponding to the RO.

According to the existing NR protocols, it can be derived that, in NR, ROs in different positions within the periodicity play different roles because they may correspond to different SSBs, and to ensure a successful access, the terminal device has to initiate the random access on certain ROs, which is different from LTE where the terminal device may initiate a random access on an RO at any position. Therefore, some new problems may arise in NR if the LTE backhaul link PRACH resource configuration method is followed.

Figure 3:
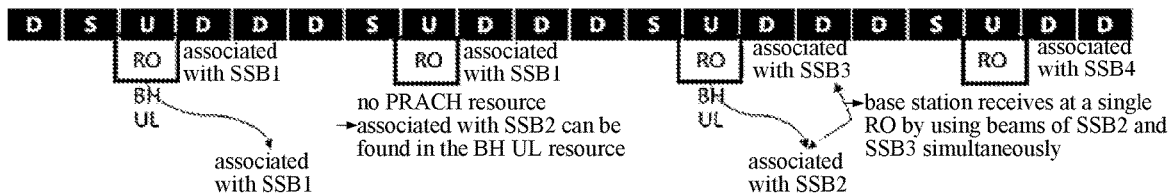
FIG. 3 is a schematic diagram of an NR mapping manner in the related art.

In NR, the random access resources configured by the donor cell have different SSBs associated therewith, as shown in FIG. 3, the ROs in every 5 ms are associated with different SSBs. If the uplink resources for the backhaul link contain only RO resources of some donor gNBs as per the conventional configuration method, PRACH resources associated with some SSBs may not be included in the backhaul UL (BH UL) resources. As shown in FIG. 3, the RO resources associated with SSB1 and SSB3 appear in the backhaul resources; in this case, if the IAB node needs to initiate a random access over SSB2, it cannot locate a corresponding resource.

To ensure that all SSBs have random access resources associated therewith in the backhaul link, a simple solution is as follows: the IAB node re-determines a valid RO according to BH UL resources and maps the valid RO to the SSBs of the donor cell, thereby it can be ensured that a complete mapping between PRACH resources in the backhaul resources and SSBs is formed. However, the solution may lead to an inconsistency in SSBs associated with the valid ROs determined by the IAB node and other terminal devices in the donor cell. As shown in FIG. 3, if ROs are remapped to BH UL resources, the IAB node would identify SSB2 as the SSB associated with the RO within the third 5 ms, while the regular UEs of the donor gNB would identify SSB3 as the SSB associated with the RO within the third 5 ms, thereby the gNB has to perform reception at a single RO by using two SSBs. Under a high frequency analogue beam architecture, the gNB cannot perform reception at a single RO by using two different beams.

Figure 4:
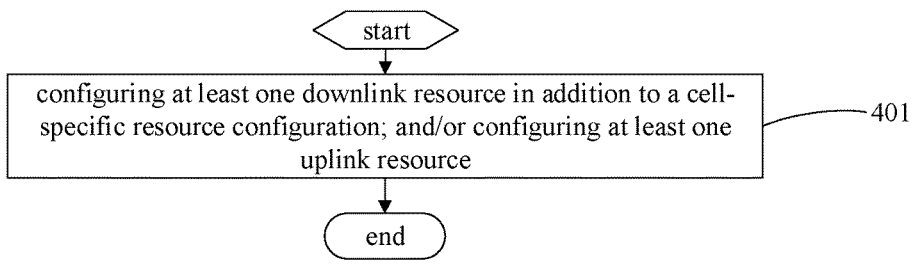
FIG. 4 is a first schematic diagram of a resource processing method according to an embodiment of the present disclosure.

FIG. 4 is a schematic diagram of a resource processing method according to an embodiment of the present disclosure. Referring to FIG. 4, the method is performed by a first node which may be a donor gNB, and includes the following specific step:

step 401: configuring at least one downlink resource in addition to a cell-specific resource configuration; and/or configuring at least one uplink resource; wherein the uplink resource may at least include a random access channel transmission opportunity corresponding to the downlink resource; or the uplink resource is orthogonal in time to a cell-specific random access resource configured by the first node.

In an embodiment of the present disclosure, optionally, the at least one configured downlink resource and/or the at least one configured uplink resource is cell-specific or dedicated, wherein the dedicated may also be referred to as UE-specific.

In an embodiment of the present disclosure, optionally, the uplink resource may include a physical random access channel transmission opportunity. The uplink resource may be an uplink resource configured for a backhaul link of a second node, wherein the second node may be an IAB node.

In an embodiment of the present disclosure, optionally, the uplink resource is offset in time by a fixed offset value from a cell-specific random access opportunity or valid random access opportunity configured by the first node.

In an embodiment of the present disclosure, optionally, the offset value may be configured explicitly by the first node.

In an embodiment of the present disclosure, optionally, the uplink resource may be determined based on a cell-specific resource configured by the first node.

In an embodiment of the present disclosure, optionally, the uplink resource may be configured independently of a cell-specific resource configured by the first node.

In an embodiment of the present disclosure, optionally, the downlink resource includes: a synchronous signal/physical broadcast channel block, and/or a channel state information reference signal.

In an embodiment of the present disclosure, optionally, the downlink resource may be a downlink resource configured for a backhaul link of the second node.

In an embodiment of the present disclosure, optionally, the synchronous signal/physical broadcast channel block includes at least one of:

a synchronous signal/physical broadcast channel block configured in an ssb-PositionsInBurst of a system information block 1 of the first node; a synchronous signal/physical broadcast channel block configured in an ssb-PositionsInBurst of a ServingCellConfigCommon of the first node; a synchronous signal/physical broadcast channel block configured by the first node through higher layer signaling.

In the embodiments of the present disclosure, the first node configures at least one downlink resources for one or more second nodes and/or configures at least one uplink resources, such that the configuration condition for uplink resources of a backhaul link may be restricted, to ensure that the uplink resource for the backhaul link configured by the first node includes a complete RO-SSB mapping period required by the second node.

Moreover, in the embodiments of the present disclosure, there is no need for the second node to perform an additional operation, and the configuration carried out by the first node ensures the mapping completeness and avoids conflict, that is, the configuration carried out by the first node ensures that the uplink resources of the second node can be mapped completely to downlink resources, and meanwhile avoids the conflicts resulting from the inconsistency with a mapping of accessing UE, thereby improving the effectiveness and reliability of communication.

Figure 5:
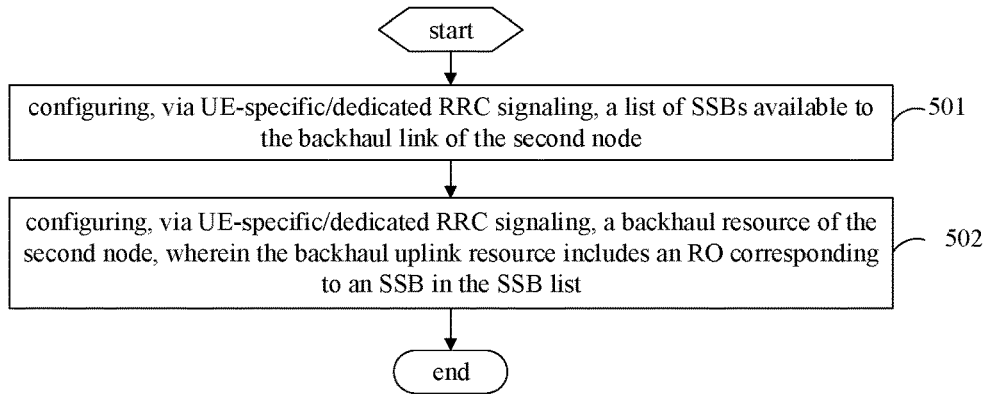
FIG. 5 is a second schematic diagram of a resource processing method according to an embodiment of the present disclosure.

FIG. 5 is another schematic diagram of a resource processing method according to an embodiment of the present disclosure. Referring to FIG. 4, the method includes the following steps 501 and 502.

Step 501: configuring, via UE-specific/dedicated RRC signaling, a list of SSBs available to the backhaul link of the second node.

In an embodiment of the present disclosure, the SSBs in the SSB list may be an SSB configured in the ssb-PositionsInBurst in SIB1 of the first node, and/or, may be an SSB configured in the ssb-PositionsInBurst in ServingCellConfigCommon.

Optionally, the SSB list may also be a new list of available SSBs configured by the first node for the second node via UE-specific/dedicated RRC signaling. It is understood, if the first node does not configure a new list of available SSBs, the SSBs in the SSB list may be the same as the SSB configured in the ssb-PositionsInBurst in SIB1 of the first node and/or the SSB configured in the ssb-PositionsInBurst in ServingCellConfigCommon.

Step 502: configuring, via UE-specific/dedicated RRC signaling, a backhaul resource of the second node, wherein the backhaul uplink resource includes an RO corresponding to an SSB in the SSB list.

In the embodiments of the present disclosure, by restricting the configuration condition for BH UL resources, it is ensured that the uplink resource for the backhaul link configured by the first node includes a complete RO-SSB mapping period required by the IAB node.

In the embodiments of the present disclosure, the first node may configure backhaul resources for at least one second node via UE-specific/dedicated RRC signaling, thereby restricting the configuration condition for BH UL resources, to ensure that the backhaul link uplink resource configured by the first node includes a complete RO-SSB mapping period required by the second node.

Moreover, in the embodiments of the present disclosure, there is no need for the second node to perform an additional operation, and the configuration carried out by the first node ensures the mapping completeness and avoids conflict, that is, the configuration carried out by the first node ensures that the PRACH resources of the second node can be mapped completely to SSBs, and meanwhile avoids the conflicts resulting from the inconsistency with a mapping of accessing UE, thereby improving the effectiveness and reliability of communication.

Figure 6:
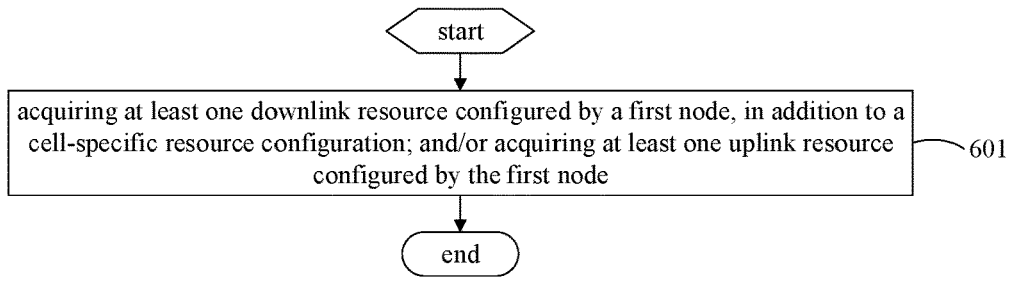
FIG. 6 is a third schematic diagram of a resource processing method according to an embodiment of the present disclosure.

FIG. 6 is another schematic diagram of a resource processing method according to an embodiment of the present disclosure. Referring to FIG. 6, the method is performed by a second node which may be an IAB node, and includes the following specific step:

step 601: acquiring at least one downlink resource configured by a first node, in addition to a cell-specific resource configuration; and/or acquiring at least one uplink resource configured by the first node;

wherein the uplink resource at least includes a random access channel transmission opportunity corresponding to the downlink resource; or the uplink resource is orthogonal in time to a cell-specific random access opportunity or valid random access opportunity configured by the first node.

In an embodiment of the present disclosure, optionally, the configuration may be cell-specific or UE-specific.

In an embodiment of the present disclosure, optionally, the uplink resource may include a physical random access channel transmission opportunity. The uplink resource may be an uplink resource configured for a backhaul link of the second node.

In an embodiment of the present disclosure, optionally, the uplink resource is offset in time by a fixed offset value from a cell-specific random access resource configured by the first node, wherein the first node may be a donor gNB. The offset value may be configured explicitly by the first node.

In an embodiment of the present disclosure, optionally, the uplink resource is determined based on a cell-specific resource configured by the first node.

In an embodiment of the present disclosure, optionally, the uplink resource is configured independently of a cell-specific resource configured by the first node.

In an embodiment of the present disclosure, optionally, the downlink resource may include: a synchronous signal/physical broadcast channel block, and/or a channel state information reference signal.

In an embodiment of the present disclosure, optionally, the downlink resource may be a downlink resource configured for a backhaul link of the second node.

In an embodiment of the present disclosure, optionally, the synchronous signal/physical broadcast channel block includes at least one of: a synchronous signal/physical broadcast channel block configured in an ssb-PositionsInBurst of a system information block 1 of the first node; a synchronous signal/physical broadcast channel block configured in an ssb-PositionsInBurst of a ServingCellConfigCommon of the first node; a synchronous signal/physical broadcast channel block configured by the first node through higher layer signaling.

In the embodiments of the present disclosure, the second node acquires from the first node at least one downlink resource configured by the first node, and/or at least one uplink resource configured by the first node, thereby restricting the configuration condition for BH UL resources, to ensure that the backhaul link uplink resource configured by the first node includes a complete RO-SSB mapping period required by the second node. In the embodiments of the present disclosure, there is no need for the second node to perform an additional operation, and the configuration carried out by the first node ensures the mapping completeness and avoids conflict, that is, the PRACH resources of the second node can be mapped completely to SSBs, and meanwhile the conflict resulting from the inconsistency with a mapping of accessing UE is avoided.

Figure 7:
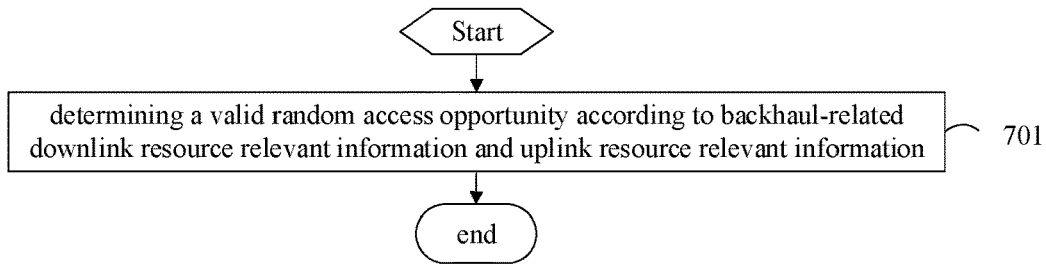
FIG. 7 is a fourth schematic diagram of a resource processing method according to an embodiment of the present disclosure.

FIG. 7 is a schematic diagram of a resource processing method according to an embodiment of the present disclosure. Referring to FIG. 7, the method is performed by a third node which may be an IAB node, and includes the following specific step:

step 701: determining a valid random access opportunity according to backhaul-related downlink resource relevant information and uplink resource relevant information.

In an embodiment of the present disclosure, optionally, the backhaul-related downlink resource relevant information includes at least one of: a backhaul downlink resource configured through higher layer signaling; a synchronous signal/physical broadcast channel block.

In an embodiment of the present disclosure, optionally, the backhaul-related uplink resource relevant information includes at least one of: a backhaul uplink resource configured through higher layer signaling; a random access resource.

In an embodiment of the present disclosure, optionally, a first valid random access opportunity is a valid random access opportunity determined according to downlink resource information and uplink resource relevant information configured through higher layer signaling.

In an embodiment of the present disclosure, optionally, the valid random access opportunity includes:

(1) a random access opportunity that is in the backhaul uplink resource and does not overlap with a first valid random access opportunity; and/or (2) a random access opportunity that is in a resource at least N gap symbols after a last symbol of the backhaul downlink resource or at least N gap symbols after a last symbol of the synchronous signal/physical broadcast channel block, and does not overlap with the first valid random access opportunity; and/or (3) a random access opportunity that does not precede a synchronous signal/physical broadcast channel block in a slot of the random access resource, is in a resource at least N gap symbols after a last symbol of the backhaul downlink resource or at least N gap symbols after a last symbol of the synchronous signal/physical broadcast channel block, and does not overlap with the first valid random access opportunity; wherein N is greater than or equal to 0.

In an embodiment of the present disclosure, optionally, the synchronous signal/physical broadcast channel block is the same as a synchronous signal/physical broadcast channel block configured in an ssb-PositionsInBurst; or the synchronous signal/physical broadcast channel block is of a first SSB format reconfigured through higher layer signaling, wherein the first SSB format is a subset of SSB formats configured in the ssb-PositionsInBurst.

In an embodiment of the present disclosure, optionally, an association mapping is performed based on the valid random access opportunity and a synchronous signal/physical broadcast channel block.

In the embodiments of the present disclosure, the third node determines a valid random access opportunity according to backhaul-related downlink resource relevant information and uplink resource relevant information. In this way, new PRACH resources are configured via configuration signaling of the first node for the transmission of the backhaul link, and by means of the new valid RO determination criterion of the third node, it can be guaranteed that the third node and the accessing UE use completely time-orthogonal PRACH resources, thereby ensuring that the PRACH resources of the third node can be mapped completely to SSBs, and meanwhile the conflict resulting from the inconsistency with a mapping of accessing UE is avoided.

It is understood, in the embodiments of the present disclosure, it is necessary to introduce an additional determination carried out by the third node, but the requirements on the configuration performed by the first node may be reduced.

Figure 8:
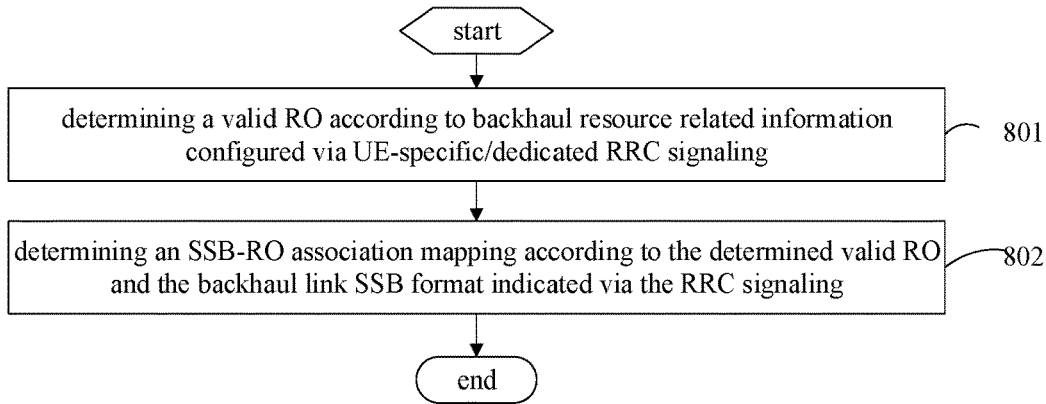
FIG. 8 is a fifth schematic diagram of a resource processing method according to an embodiment of the present disclosure.

FIG. 8 is another schematic diagram of a resource processing method according to an embodiment of the present disclosure. Referring to FIG. 8, the method is performed by a third node which may be an IAB node, and includes the following steps 801 and 802.

Step 801: determining a valid RO according to backhaul resource related information configured via UE-specific/dedicated RRC signaling.

It may be understood, before the third node accesses the network, the valid RO is determined according to the terminal device behavior in the related art. The first node configures cell-specific CBRA and CFRA resources via rach-ConfigCommon field in SIB1. The terminal device and the third node not accessing the network determine the valid RO (CBRA/CFRA) and SSB-RO association mapping based on the actual SSB transmission format indicated in SIB1 and the uplink and downlink resources configured in SIB1 according to the stipulation of the NR protocol in the related art.

After the third node accesses the network, the first node configures, via the UE-specific/dedicated RRC signaling, the backhaul UL time domain resources and backhaul UL BWP for the third node. In the backhaul UL BWP configuration, the PRACH resource for the backhaul link is configured via the rach ConfigBackhaul field. The third node determines the valid RO according to the backhaul resource related information configured via the UE-specific/dedicated RRC signaling.

In the embodiments of the present disclosure, the valid RO for the BH refers to at least one of: (1) a portion of the BH UL resource configured by the base station that does not overlap with a valid RO of accessing UE; (2) a portion of the BH UL resource configured by the first node that is in a resource symbols after an SSB or a downlink symbol, and does not overlap with a valid RO of accessing UE; (3) a portion of the BH UL resource configured by the first node that does not precede an SSB in the PRACH slot, is in a resource symbols after an SSB or a downlink symbol, and does not overlap with a valid RO of accessing UE; (4) a portion of the backhaul link PRACH resource configured by the base station that does not overlap with a valid RO of accessing UE.

Step 802: determining an SSB-RO association mapping according to the valid RO determined in the step 801 and the backhaul link SSB format indicated via the RRC signaling.

The backhaul link SSB format may be the same as the SSB format configured in ssb-PositionsInBurst, or a subset of the SSB format configured in ssb-PositionsInBurst may be reconfigured via RRC signaling.

In the embodiments of the present disclosure, the third node determines the valid RO according to backhaul resource related information configured via UE-specific/dedicated RRC signaling, and then the third node determines an SSB-RO association mapping according to the valid RO determined in the step 801 and the backhaul link SSB format indicated via the RRC signaling. In this way, new PRACH resources are configured via configuration signaling of the first node for the transmission of the backhaul link, and by means of the new valid RO determination criterion of the third node, it can be guaranteed that the third node and the accessing UE use completely time-orthogonal PRACH resources, thereby ensuring that the PRACH resources of the third node can be mapped completely to SSBs, and meanwhile the conflict resulting from the inconsistency with a mapping of accessing UE is avoided. In the embodiments of the present disclosure, it is necessary to introduce an additional determination carried out by the third node, but the requirements on the configuration performed by the first node may be reduced.

In the embodiments of the present disclosure, a first node, a second node and a third node are further provided. Since the theory in which the first node, the second node and the third node solve problems is similar to the resource processing method in the embodiments of the present disclosure, for the implementations of the first node, the second node and the third node, a reference may be made to the implementation of the method, and repeated description is omitted.

Figure 9:
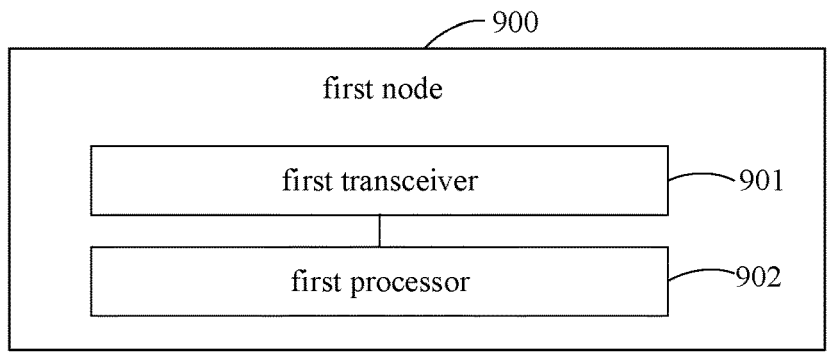
FIG. 9 is a first schematic diagram of a first node according to an embodiment of the present disclosure.

Referring to FIG. 9, an embodiment of the present disclosure provides a first node 900, including a first transceiver 901 and a first processor 902.

The first transceiver 901 is configured to configure at least one downlink resource in addition to a cell-specific resource configuration; and/or configure at least one uplink resource.

Optionally, the uplink resource at least includes a random access channel transmission opportunity corresponding to the downlink resource; or the uplink resource is orthogonal in time to a cell-specific random access resource configured by the first node.

Optionally, the at least one configured downlink resource and/or the at least one configured uplink resource is cell-specific or UE-specific.

Optionally, the downlink resource includes: a synchronous signal/physical broadcast channel block, and/or a channel state information reference signal.

Optionally, the downlink resource is a downlink resource configured for a backhaul link of a second node.

Optionally, the synchronous signal/physical broadcast channel block includes at least one of:

a synchronous signal/physical broadcast channel block configured in an ssb-PositionsInBurst of a system information block 1 of the first node;

a synchronous signal/physical broadcast channel block configured in an ssb-PositionsInBurst of a ServingCellConfigCommon of the first node;

a synchronous signal/physical broadcast channel block configured by the first node through higher layer signaling.

Optionally, the uplink resource includes a physical random access channel transmission opportunity.

Optionally, the uplink resource is an uplink resource configured for a backhaul link of a second node.

Optionally, the uplink resource is offset in time by a fixed offset value from a cell-specific random access opportunity or valid random access opportunity configured by the first node.

Optionally, the offset value is configured explicitly by the first node.

Optionally, the uplink resource is determined based on a cell-specific resource configured by the first node.

Optionally, the uplink resource is configured independently of a cell-specific resource configured by the first node.

It is noted, the first node provided by the embodiment of the present disclosure can implement the various processes in the method embodiments of FIG. 4 and FIG. 5, and have similar implementation principle and technical effects. A repeated description thereof is omitted in this embodiment.

Figure 10:
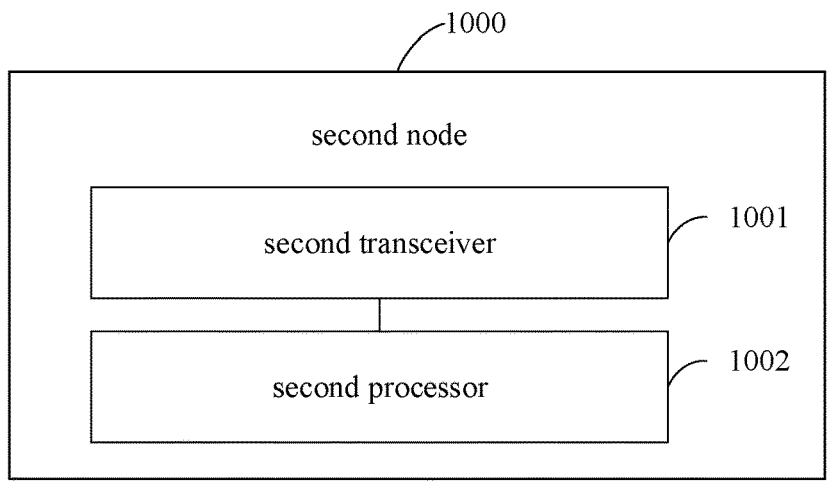
FIG. 10 is a first schematic diagram of a second node according to an embodiment of the present disclosure.

Referring to FIG. 10, an embodiment of the present disclosure further provides a second node 1000, including a second transceiver 1001 and a second processor 1002.

The second transceiver 1001 is configured to acquire at least one downlink resource configured by a first node, in addition to a cell-specific resource configuration; and/or acquire at least one uplink resource configured by the first node.

Optionally, the uplink resource at least includes a random access channel transmission opportunity corresponding to the downlink resource; or the uplink resource is orthogonal in time to a cell-specific random access resource configured by the first node.

Optionally, the at least one configured downlink resource and/or the at least one configured uplink resource is cell-specific or UE-specific.

Optionally, the downlink resource includes: a synchronous signal/physical broadcast channel block, and/or a channel state information reference signal.

Optionally, the downlink resource is a downlink resource configured for a backhaul link of the second node.

Optionally, the synchronous signal/physical broadcast channel block includes at least one of:
  a synchronous signal/physical broadcast channel block configured in an ssb-PositionsInBurst of a system information block 1 of the first node;
  a synchronous signal/physical broadcast channel block configured in an ssb-PositionsInBurst of a ServingCellConfigCommon of the first node;
  a synchronous signal/physical broadcast channel block configured by the first node through higher layer signaling.

Optionally, the uplink resource includes a physical random access channel transmission opportunity.

Optionally, the uplink resource is an uplink resource configured for a backhaul link of the second node.

Optionally, the uplink resource is offset in time by a fixed offset value from a cell-specific random access opportunity or valid random access opportunity configured by the first node.

Optionally, the offset value is configured explicitly by the first node.

Optionally, the uplink resource is determined based on a cell-specific resource configured by the first node.

Optionally, the uplink resource is configured independently of a cell-specific resource configured by the first node.

It is noted, the second node provided by the embodiment of the present disclosure can implement the various processes in the method embodiments of FIG. 6. To avoid repetition, a detailed description is omitted.

Figure 11:
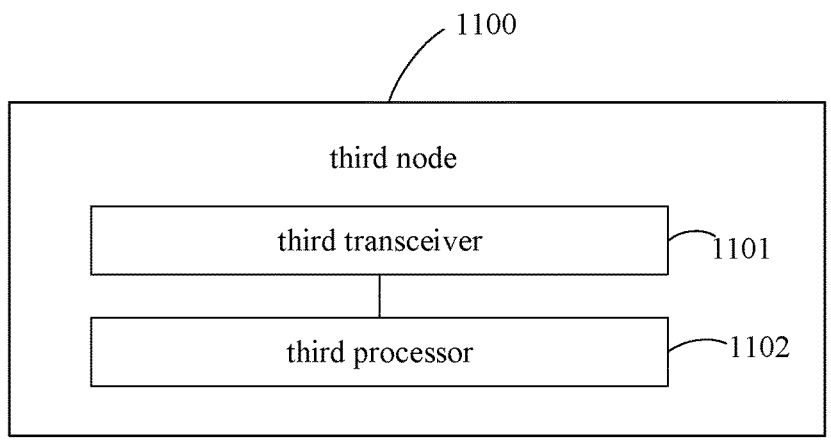
FIG. 11 is a first schematic diagram of a third node according to an embodiment of the present disclosure.

Referring to FIG. 11, an embodiment of the present disclosure further provides a third node 1100, including a third transceiver 1101 and a third processor 1102.

The third processor 1102 is configured to determine a valid random access opportunity according to backhaul-related downlink resource relevant information and uplink resource relevant information.

Optionally, the backhaul-related downlink resource relevant information includes at least one of:
  a backhaul downlink resource configured through higher layer signaling;
  a synchronous signal/physical broadcast channel block.

Optionally, the backhaul-related uplink resource relevant information includes at least one of:
  a backhaul uplink resource configured through higher layer signaling;
  a random access resource.

Optionally, the valid random access opportunity includes:
  a random access opportunity that is in the backhaul uplink resource and does not overlap with a first valid random access opportunity; and/or
  a random access opportunity that is in a resource at least N gap symbols after a last symbol of the backhaul downlink resource or at least N gap symbols after a last symbol of the synchronous signal/physical broadcast channel block, and does not overlap with the first valid random access opportunity; and/or
  a random access opportunity that does not precede a synchronous signal/physical broadcast channel block in a slot of the random access resource, is in a resource at least N gap symbols after a last symbol of the backhaul downlink resource or at least N gap symbols after a last symbol of the synchronous signal/physical broadcast channel block, and does not overlap with the first valid random access opportunity; wherein N is greater than or equal to 0.

Optionally, the synchronous signal/physical broadcast channel block is the same as a synchronous signal/physical broadcast channel block configured in an ssb-PositionsInBurst; or the synchronous signal/physical broadcast channel block is of a first SSB format reconfigured through higher layer signaling, wherein the first SSB format is a subset of SSB formats configured in the ssb-PositionsInBurst.

Optionally, the first valid random access opportunity is a valid random access opportunity determined according to downlink resource information and uplink resource relevant information configured through higher layer signaling.

Optionally, an association mapping is performed based on the valid random access opportunity and a synchronous signal/physical broadcast channel block.

It is noted, the third node provided by the embodiment of the present disclosure can implement the various processes in the method embodiments of FIG. 7 and FIG. 8. To avoid repetition, a detailed description is omitted.

To solve the problem of remote interference, in the embodiments of the present disclosure, a first node, a second node and a third node are further provided. Since the theory in which the first node, the second node and the third node solve problems is similar to the resource processing method in the embodiments of the present disclosure, for the implementations of the first node, the second node and the third node, a reference may be made to the implementation of the method, and repeated description is omitted.

Figure 12:
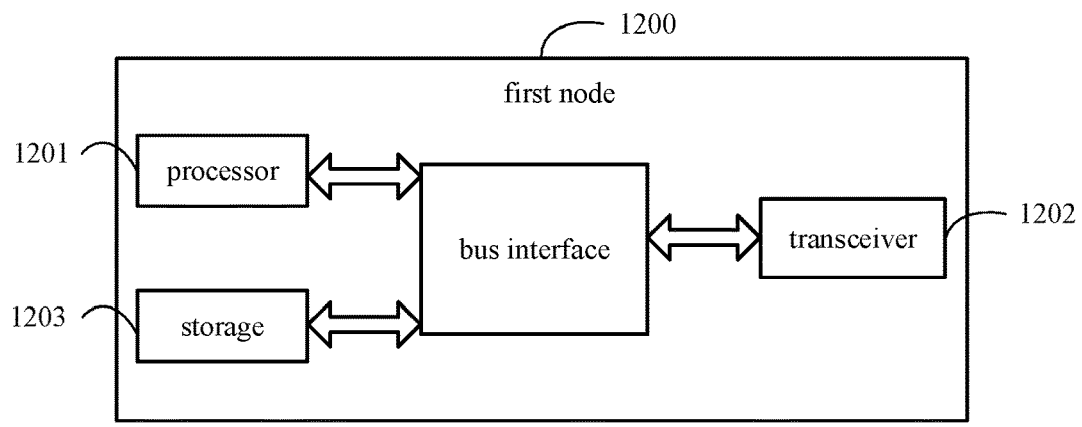
FIG. 12 is a second schematic diagram of a first node according to an embodiment of the present disclosure.

FIG. 12 is a schematic structural diagram of a first node according to an embodiment of the present disclosure. As shown in FIG. 12, the first node 1200 includes: a processor 1201, a transceiver 1202, a storage 1203 and a bus interface.

In an embodiment of the present disclosure, the first node 1200 further includes: a computer program stored in the storage 1203 and configured to be executed by the processor 1201. The processor 1201 is configured to execute the computer program to implement the following step: configuring at least one downlink resource; and/or configuring at least one uplink resource; wherein the uplink resource at least includes a random access channel transmission opportunity corresponding to the downlink resource; or the uplink resource is orthogonal in time to a cell-specific random access resource configured by the first node.

In FIG. 12, a bus architecture may include any number of interconnected buses and bridges, and connects various circuits including one or more processors represented by the processor 1201 and storage represented by the storage 1203. The bus architecture may also connect various other circuits such as peripherals, voltage regulators and power management circuits, which is well known in the art. Therefore, a detailed description thereof is omitted herein. A bus interface provides an interface. The transceiver 1202 may be multiple elements, such as a receiver and a transmitter, to allow for communication with various other apparatuses on the transmission medium.

The processor 1201 is responsible for supervising the bus architecture and normal operation and the storage 1203 stores the data being used by the processor 1201 during operation.

Figure 13:
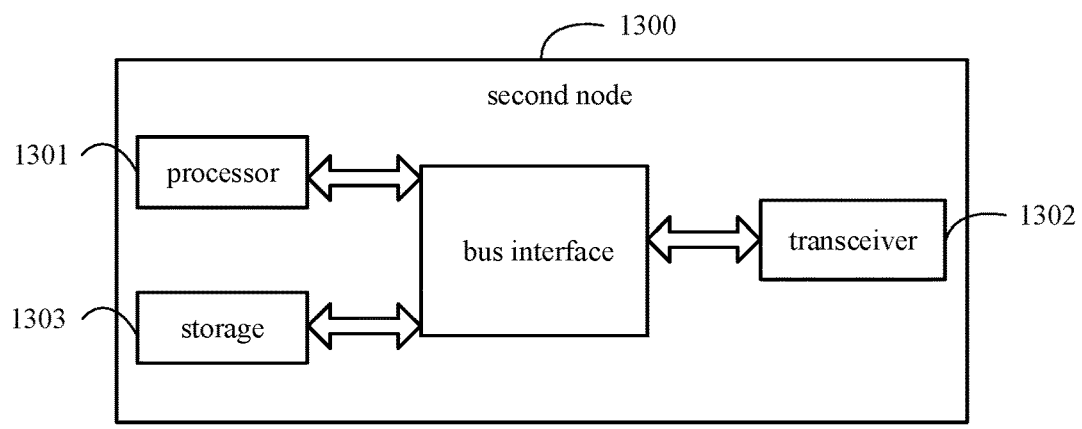
FIG. 13 is a second schematic diagram of a second node according to an embodiment of the present disclosure.

The first node provided by the embodiment of the present disclosure can implement the various processes in the method embodiments of FIG. 4 and FIG. 5. To avoid repetition, a detailed description thereof is omitted herein. FIG. 13 is a schematic structural diagram of a second node according to an embodiment of the present disclosure. As shown in FIG. 13, the second node 1300 includes: a processor 1301, a transceiver 1302, a storage 1303 and a bus interface. Wherein: acquiring at least one downlink resource configured by a first node; and/or acquiring at least one uplink resource configured by the first node. The uplink resource at least includes a random access channel transmission opportunity corresponding to the downlink resource; or the uplink resource is orthogonal in time to a cell-specific random access opportunity or valid random access opportunity configured by the first node.

In an embodiment of the present disclosure, the second node 1300 further includes: a computer program stored in the storage 1303 and configured to be executed by the processor 1301. The processor 1301 is configured to execute the computer program to implement the following step: acquiring at least one downlink resource configured by a first node; and/or acquiring at least one uplink resource configured by the first node. The uplink resource at least includes a random access channel transmission opportunity corresponding to the downlink resource; or the uplink resource is orthogonal in time to a cell-specific random access opportunity or valid random access opportunity configured by the first node.

In FIG. 13, a bus architecture may include any number of interconnected buses and bridges, and connects various circuits including one or more processors represented by the processor 1301 and storage represented by the storage 1303. The bus architecture may also connect various other circuits such as peripherals, voltage regulators and power management circuits, which is well known in the art. Therefore, a detailed description thereof is omitted herein. A bus interface provides an interface. The transceiver 1302 may be multiple elements, such as a receiver and a transmitter, to allow for communication with various other apparatuses on the transmission medium.

The processor 1301 is responsible for supervising the bus architecture and normal operation and the storage 1303 stores the data being used by the processor 1301 during operation.

The second node provided by the embodiment of the present disclosure can implement the various processes in the method embodiments of FIG. 6. To avoid repetition, a detailed description thereof is omitted herein.

Figure 14:
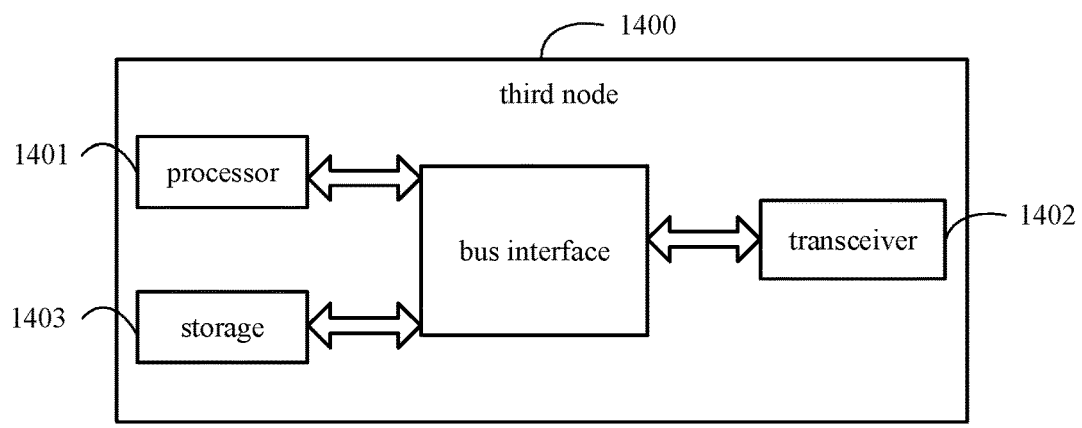
FIG. 14 is a second schematic diagram of a third node according to an embodiment of the present disclosure.

FIG. 14 is a schematic structural diagram of a third node according to an embodiment of the present disclosure. As shown in FIG. 14, the third node 1400 includes: a processor 1401, a transceiver 1402, a storage 1403 and a bus interface.

In an embodiment of the present disclosure, the third node 1400 further includes: a computer program stored in the storage 1403 and configured to be executed by the processor 1401. The processor 1401 is configured to execute the computer program to implement the following step: determining a valid random access opportunity according to backhaul-related downlink resource relevant information and uplink resource relevant information.

In FIG. 14, a bus architecture may include any number of interconnected buses and bridges, and connects various circuits including one or more processors represented by the processor 1401 and storage represented by the storage 1403. The bus architecture may also connect various other circuits such as peripherals, voltage regulators and power management circuits, which is well known in the art. Therefore, a detailed description thereof is omitted herein. A bus interface provides an interface. The transceiver 1402 may be multiple elements, such as a receiver and a transmitter, to allow for communication with various other apparatuses on the transmission medium.

The processor 1401 is responsible for supervising the bus architecture and normal operation and the storage 1403 stores the data being used by the processor 1201 during operation.

The third node provided by the embodiment of the present disclosure can implement the various processes in the method embodiments of FIG. 7 and FIG. 8. To avoid repetition, a detailed description thereof is omitted herein. An embodiment of the present disclosure further provides a computer readable storage medium storing therein a computer program, wherein the program is configured to be executed by a processor to implement steps of the foregoing system message processing method or system message configuration method.

It is understood, "one embodiment" or "an embodiment" mentioned throughout the specification means specific features, structures or characteristics related to the embodiment are included in at least one embodiment of the present disclosure. Therefore, "in one embodiment" or "in an embodiment" mentioned throughout the specification does not necessarily refer to the same embodiment. Additionally, these specific features, structures or characteristics may be combined in any suitable manner in one or more embodiments.

In various embodiments of the present disclosure, it is understood, the numbering of various processes is not intended to imply an execution sequence. The execution sequence of the processes should be determined in accordance with the functions and inherent logic thereof, and by no means constitutes any limitation as to the implementation of the embodiments of the present disclosure.

In the embodiments provided in this application, it is understood, expression "B corresponding to A" represents that B is associated with A and B may be determined according to A. however, it is further understood, B being determined according to A does not mean B is determined exclusively according to A, rather, B may be determined according to A and/or other information.

In the several embodiments provided in this application, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

In addition, various functional units in the embodiments of the present disclosure may be integrated into one processing unit, or each of the units may exist alone physically. Alternatively, two or more functional units may be integrated into one unit. The above integrated unit may be implemented in form of hardware, or may be implemented in form of a combination of hardware and software functional unit.

Those of ordinary skill in the art will recognize that, the units and algorithm steps of the various embodiments described above, may be implemented by electronic hardware, or by a combination of computer software and electronic hardware. Whether these functions are implemented by hardware or software depends on the specific application and design constraints of the solution. A skilled artisan may use different methods to implement the described functions for each particular application, but such implementations are not to be considered as departing from the scope of the present disclosure. The electronic hardware includes, but is not limited to: an electronic circuit, an application specific integrated circuit, a programmable logic device, a programmable processor, and the like.

When the integrated unit is implemented in a form of the software function module, the integrated unit may be stored in a computer-readable storage medium. The software function unit stored on the storage medium includes instructions configured to be executed by a computer device (which may be a personal computer, a server or a network device, etc.) to implement part of the steps of the methods of the embodiments of the present disclosure. The storage medium includes a Universal Serial Bus (USB) disk, a removable hard disk, a Read-Only Memory (ROM), a Random Access Memory (RAM), a magnetic disk, an optical disc, and other medium capable of storing program code.

The above describes optional implementations of the present disclosure. It should be noted that modifications and replacements may be made in the embodiments by a person skilled in the art without departing from the principle of the present disclosure, and these modifications and replacements shall also be deemed as falling within the scope of the present disclosure.

What is claimed is:

1. A resource processing method, applied to a first node, comprising:
    in addition to a cell-specific resource configuration, configuring at least one uplink resource for a backhaul link of an integrated access and backhaul (IAB) node;
    wherein the uplink resource configured for the backhaul link of the IAB node is orthogonal in time to a cell-specific random access opportunity or valid random access opportunity configured for a terminal device by the first node;
    wherein the first node is a mother node of the IAB node;
    wherein the uplink resource is determined based on a cell-specific resource configured by the first node;
    wherein the uplink resource is offset in time by a fixed offset value from the cell-specific random access opportunity or valid random access opportunity configured by the first node, and the offset value is configured explicitly by the first node.

2. The resource processing method according to claim 1, wherein the at least one configured uplink resource is cell-specific or dedicated; or,
    wherein the uplink resource comprises a physical random access channel transmission opportunity.

3. A first node, comprising a processor, a storage and a computer program stored in the storage and configured to be executed by the processor, wherein the processor is configured to execute the computer program to implement steps of the resource processing method according to claim 1.

4. A resource processing method, applied to an integrated access and backhaul (IAB) node, comprising:
    acquiring at least one uplink resource configured by a first node for a backhaul link of the IAB node, in addition to a cell-specific resource configuration;
    wherein the uplink resource configured for the backhaul link of the IAB node is orthogonal in time to a cell-specific random access opportunity or valid random access opportunity configured for a terminal device by the first node;
    wherein the first node is a mother node of the IAB node;
    wherein the uplink resource is determined based on a cell-specific resource configured by the first node;
    wherein the uplink resource is offset in time by a fixed offset value from the cell-specific random access opportunity or valid random access opportunity configured by the first node, and the offset value is configured explicitly by the first node.

5. The resource processing method according to claim 4, wherein the at least one configured uplink resource is cell-specific or dedicated.

6. The resource processing method according to claim 4, wherein the uplink resource comprises a physical random access channel transmission opportunity.

7. A second node, comprising a processor, a storage and a computer program stored in the storage and configured to be executed by the processor, wherein the processor is configured to execute the computer program to implement steps of the resource processing method according to claim 4.

* * * * *